(12) United States Patent
Han et al.

(10) Patent No.: US 10,927,290 B2
(45) Date of Patent: Feb. 23, 2021

(54) CHEMICAL IMBIBITION BY GELS CONTAINING SURFACTANTS FOR FRACTURED CARBONATE RESERVOIRS

(71) Applicant: Saudi Arabian Oil Company, Dhahran (SA)

(72) Inventors: Ming Han, Dhahran (SA); Jinxun Wang, Dhahran (SA); Dongqing Cao, Beijing (CN); Abdullah Al-Boqmi, Abqaiq (SA); Amar J. Alshehri, Dammam (SA)

(73) Assignee: SAUDI ARABIAN OIL COMPANY

( * ) Notice: Subject to any disclaimer, the term of this patent is extended or adjusted under 35 U.S.C. 154(b) by 152 days.

(21) Appl. No.: 15/267,915

(22) Filed: Sep. 16, 2016

(65) Prior Publication Data
US 2017/0081583 A1    Mar. 23, 2017

Related U.S. Application Data (60) Provisional application No. 62/219,945, filed on Sep. 17, 2015.

(51) Int. Cl.
*C09K 8/588* (2006.01)
*C09K 8/50* (2006.01)
(Continued)

(52) U.S. Cl.
CPC .......... *C09K 8/588* (2013.01); *C09K 8/50* (2013.01); *C09K 8/584* (2013.01); *E21B 43/20* (2013.01)

(58) Field of Classification Search
CPC .................................................. E21B 43/16
See application file for complete search history.

(56) References Cited

U.S. PATENT DOCUMENTS

| 4,036,300 A | 7/1977 | Holm et al. |
| 4,194,565 A | 3/1980 | Kalfoglou |

(Continued)

FOREIGN PATENT DOCUMENTS

| WO | 2006109038 A1 | 10/2006 |
| WO | WO2012063199 A2 | 5/2012 |
| WO | 2017049048 A1 | 3/2017 |

OTHER PUBLICATIONS

Bai, et al. "Preformed Particle Gel for Conformance Control: Transport Mechanism Through Porous Media" SPE 8946: Reservoir Evaluation and Engineering, Apr. 2007; pp. 176-184.

(Continued)

*Primary Examiner* — William D Hutton, Jr.
*Assistant Examiner* — Avi T Skaist
(74) *Attorney, Agent, or Firm* — Bracewell LLP; Constance R. Rhebergen (57) ABSTRACT

An imbibition gel composition that induces spontaneous imbibition of a water phase into a reservoir matrix is provided. The imbibition gel composition including a surfactant, the surfactant operable to alter the wettability of a surface of a reservoir matrix from oil-wet toward water-wet and the surfactant further operable to diffuse through the water phase. The imbibition gel composition further including a gel system, the gel system operable to retain the surfactant and the gel system further operable to release the surfactant in the presence of the water phase, where altering the wettability of the surface of the reservoir matrix toward water-wet induces the spontaneous imbibition of the water phase into the reservoir matrix.

4 Claims, 5 Drawing Sheets

(51) Int. Cl.
*C09K 8/584* (2006.01)
*E21B 43/20* (2006.01)

(56) References Cited

U.S. PATENT DOCUMENTS

| | | | |
|---|---|---|---|
| 4,317,893 A | 3/1982 | Chen et al. | |
| 4,438,814 A | 3/1984 | Bousaid | |
| 4,479,894 A | 10/1984 | Chen et al. | |
| 4,579,670 A | 4/1986 | Payne | |
| 4,683,949 A | 8/1987 | Sydansk et al. | |
| 4,842,065 A | 6/1989 | McClure | |
| 5,169,559 A | 12/1992 | Naae et al. | |
| 5,411,086 A | 5/1995 | Burcham et al. | |
| 5,662,168 A | 9/1997 | Smith | |
| 5,780,395 A | 7/1998 | Sydansk | |
| 5,836,392 A | 11/1998 | Urlwin-Smith | |
| 6,030,928 A | 2/2000 | Stahl et al. | |
| 6,268,314 B1 | 7/2001 | Hughes et al. | |
| 7,373,977 B1 * | 5/2008 | Berger | C09K 8/584 166/270.1 |
| 8,263,533 B2 | 9/2012 | Tabary et al. | |
| 2004/0035580 A1 | 2/2004 | Bouwmeester et al. | |
| 2007/0089881 A1 | 4/2007 | Hutchins et al. | |
| 2008/0280789 A1 | 11/2008 | Welton et al. | |
| 2009/0111716 A1 | 4/2009 | Hough et al. | |
| 2009/0145607 A1 | 6/2009 | Li | |
| 2011/0265997 A1 | 11/2011 | Miquilena | |
| 2013/0037265 A1 | 2/2013 | Chabert et al. | |
| 2013/0043024 A1 | 2/2013 | Stehle | |
| 2013/0056199 A1 | 3/2013 | Reddy et al. | |
| 2013/0081822 A1 | 4/2013 | Han et al. | |
| 2013/0118748 A1 | 5/2013 | Miquilena et al. | |
| 2013/0133887 A1 | 5/2013 | Todd | |
| 2013/0233551 A1 | 9/2013 | Lin et al. | |
| 2013/0312997 A1 | 11/2013 | Korte et al. | |
| 2013/0319670 A1 | 12/2013 | Lin et al. | |
| 2014/0367111 A1 | 12/2014 | Gamage et al. | |
| 2016/0237336 A1 * | 8/2016 | Cortez | C09K 8/04 |
| 2017/0081583 A1 | 3/2017 | Han et al. | |

OTHER PUBLICATIONS

Han, et al. "Effect of Surfactants on Water Imbibition into Heterogeous Carbonate Rocks at Elevated Temperature" SPE 141205, Sep. 2011, pp. 1-11.

International Search Report and Written Opinion for International Application No. PCT/US2016/052075; International Filing Date Sep. 16, 2016; Report dated Nov. 23, 2016 (pp. 1-15).

Robert D. Sydansk and Laura Romero-Zeron, "Improving Conformance by Reductin Permeability" Reservoir Conformance Improvement, Chapter 8, Society of Petroleum Engineerings, 2011 pp. 68-83.

1st OA of Chinese Patent Application No. 2016800672947, dated Apr. 1, 2020, 12 pages.

* cited by examiner

CHEMICAL IMBIBITION BY GELS CONTAINING SURFACTANTS FOR FRACTURED CARBONATE RESERVOIRS

CROSS REFERENCE TO RELATED APPLICATIONS

This application claims priority from U.S. Provisional Application No. 62/219,945 filed on Sep. 17, 2015. For purposes of United States patent practice, this application incorporates the contents of the Provisional Application by reference in its entirety.

TECHNICAL FIELD

Disclosed are a composition and a method to improve oil recovery during an enhanced oil recovery (EOR) operation in a hydrocarbon-bearing reservoir.

BACKGROUND

When a displacement process, like waterflooding or surfactant flooding, is implemented in a hydrocarbon-bearing reservoir with large variations in geologic heterogeneity, the injected fluid tends to flow through the zones with the highest permeability; thus, low permeability zones receive only a small fraction of the injected fluid. Bypassing low permeability zones can lead to production of relatively large volumes of injected fluid per barrel of recovered oil. The result can be that a large volume of oil remains in the bypassed or unswept regions of the reservoir. The use of conformance control can increase water injection sweep efficiency. Conformance control is a general term that describes methods and systems to improve the recovery of oil and reduce the recovery and use of water. Many conformance control methods use gels in injection wells. The gels are placed in the high permeability zones by injection, with the gels taking the form of gelants. The subsequent water injection will be diverted to unswept zones to modify the prevailing reservoir inflow profiles and eventually produce the remaining oil. Current gel methods are limited to fractured reservoirs because a gel is a three-dimensional network that cannot flow in a reservoir matrix.

Aqueous surfactants have been used in recovering crude oil from subterranean formations by secondary and tertiary oil recovery processes. In surfactant flooding, the injection fluid has a surfactant concentration in the range of 0.2% to 1.0%. In a surfactant flooding process, the injection fluid floods the reservoir matrix, the water in the injection fluid acts as a carrier and the surfactant moves over the surface of the reservoir matrix at the velocity of the water. In surfactant flooding or surfactant-polymer flooding, a surfactant or a surfactant-polymer is injected into the reservoir, where an oil bank forms as the surfactants cause the release of oil from the reservoir matrix. A second injection of viscous water chases the oil bank from the reservoir to production wells and ultimately to the surface. In order for the surfactants in surfactant flooding to work there must be an ultra-low interfacial tension between the oil and the surfactant solution. One of the disadvantages of surfactant flooding is due to the low viscosities of surfactant solutions—near to the viscosities of water. The low viscosity causes viscous fingering in heterogeneous reservoirs during injection of the fluids and propagation through the reservoir. Viscous fingering limits the effectiveness of applications using surfactants alone. In addition, the adsorption of surfactants in the rock surfaces of the reservoir matrix causes a loss of surfactant in the solution, making the use of surfactants alone economically unfeasible.

SUMMARY

Disclosed are a composition and method to improve oil recovery during an enhanced oil recovery (EOR) operation in a hydrocarbon-bearing reservoir. More specifically, disclosed are a composition and method to improve conformance control by introducing a surfactant in a gelled system to a carbonate reservoir during a waterflooding operation.

In a first aspect, an imbibition gel composition that induces spontaneous imbibition of a water phase into a reservoir matrix is provided. The imbibition gel composition includes a surfactant operable to alter the wettability of a surface of a reservoir matrix from oil-wet toward water-wet. The surfactant is further operable to diffuse through the water phase. The imbibition gel composition further includes a gel system operable to retain the surfactant. The gel system is further operable to release the surfactant in the presence of the water phase, where altering the wettability of the surface of the reservoir matrix toward water-wet induces the spontaneous imbibition of the water phase into the reservoir matrix.

In certain aspects, the gel system is a crosslinked gel system. In certain aspects, the crosslinked gel system is a polyacrylamide crosslinked system. In certain aspects, the crosslinked gel system is a 0.5% by weight sulfonated polyacrylamide crosslinked with a 0.01% by weight Chromium (III) crosslinker. In certain aspects, the surfactant is a betaine-type amphoteric surfactant. In certain aspects, a concentration of the surfactant in the imbibition gel composition is in the range between 0.3% and 0.6% by weight of the gel system. In certain aspects, a concentration of the surfactant in the imbibition gel composition is in the range between 0.5% and 1.0% by weight of the gel system.

In a second aspect, a conformance control fluid that induces spontaneous imbibition of a water phase into a reservoir matrix is provided. The conformance control fluid includes an imbibition gel composition that includes a surfactant operable to alter the wettability of a surface of a reservoir matrix from oil-wet toward water-wet. The surfactant is further operable to diffuse through the water phase. The imbibition gel composition further includes a gel system operable to retain the surfactant. The gel system is further operable to release the surfactant in the presence of the water phase, where altering the wettability of the surface of the reservoir matrix toward water-wet induces the spontaneous imbibition of the water phase into the reservoir matrix. The conformance control fluid further includes a carrier fluid that is operable to carry the imbibition gel composition into contact with the surface of the reservoir matrix.

In certain aspects, the carrier fluid is water-based. In certain aspects, the carrier fluid comprises a brine having a salinity between 35,000 ppm by weight and 100,000 ppm by weight. In certain aspects, the carrier fluid comprises a brine having a salinity between 55,000 ppm by weight and 60,000 ppm by weight.

In a third aspect, a method for recovering oil from a hydrocarbon-bearing reservoir by inducing spontaneous imbibition of a water phase into a reservoir matrix is provided. The method for recovering oil includes the steps of introducing through an injection well in the hydrocarbon-bearing reservoir an imbibition gel composition into a permeable channel. The permeable channel is defined by a surface that interfaces with and traverses the reservoir matrix. The permeable channel containing the water phase.

The imbibition gel composition includes a surfactant operable to alter the wettability of a surface of a reservoir matrix from oil-wet toward water-wet. The surfactant is further operable to diffuse through the water phase. The imbibition gel composition further includes a gel system operable to retain the surfactant. The gel system is further operable to release the surfactant in the presence of the water phase. The reservoir matrix is an oil-wet reservoir matrix. The method for recovering oil further includes the step of maintaining the imbibition gel composition in the permeable channel to allow the surfactant to release from the gel system, where upon release from the gel system the surfactant diffuses through the water phase to the surface of the oil-wet reservoir matrix, where the surfactant adsorbs into the surface of the oil-wet reservoir matrix, such that the wettability of the surface of the reservoir matrix is altered from oil-wet to water-wet, where altering the wettability of the surface of the reservoir matrix causes spontaneous imbibition of the water phase into the reservoir matrix, where the spontaneous imbibition causes the release of a recovered oil from the reservoir matrix. The method for recovering oil further includes the step of producing through a production well a production fluid, the production fluid comprising the recovered oil.

In certain aspects, the method includes the step of combining the surfactant with the gel system to form the imbibition gel composition. In certain aspects, the method includes the steps of mixing the imbibition gel composition with a carrier fluid and introducing the mixture of the imbibition gel composition and the carrier fluid into the permeable channel, where the mixture fills the permeable channel. In certain aspects, the hydrocarbon-bearing reservoir is a carbonate reservoir.

BRIEF DESCRIPTION OF THE DRAWINGS

These and other features, aspects, and advantages of the inventive scope will become better understood with regard to the following descriptions, claims, and accompanying drawings. It is to be noted, however, that the drawings illustrate only several embodiments and are therefore not to be considered limiting of the invention's scope.

DETAILED DESCRIPTION

While the inventive scope will be described with several embodiments, it is understood that one of ordinary skill in the relevant art will appreciate that many examples, variations and alterations to the apparatus and methods described herein are within the scope and spirit of the invention. Accordingly, the embodiments described are set forth without any loss of generality, and without imposing limitations, on the claimed invention. Those of skill in the art understand that the inventive scope includes all possible combinations and uses of particular features described in the specification.

A method for recovering oil from a hydrocarbon-bearing reservoir is provided. The hydrocarbon-bearing reservoir can be any type of rock material containing pores, such that the rock material with the pores constitutes a reservoir matrix of the hydrocarbon-bearing reservoir. Examples of rock materials include carbonate rock, sandstone rock, and shale rock. In at least one instance, the hydrocarbon-bearing reservoir is a carbonate reservoir, where the reservoir matrix is a porous carbonate rock. The pores in the reservoir matrix can be of any shape or size. The pores can be connected throughout the reservoir matrix to form a contiguous fluid conduit or can be unconnected in the reservoir matrix forming non-contiguous conduits. The contiguous fluid conduit can connect two permeable channels in the hydrocarbon-bearing reservoir. As used throughout, "permeable channel" refers to a pathway connected to an injection well or a production well or both an injection well and a production well and encompasses a reservoir having one permeable channel and reservoirs having multiple permeable channels. Permeable channels allow fluids, including reservoir fluids and injection fluids, to flow through the reservoir matrix. In at least one embodiment, the permeable channel is a fracture from a previous fracturing process. In at least one embodiment, the permeable channel is naturally present in the reservoir matrix. In at least one embodiment, the permeable channels are a mixture of naturally occurring permeable channels and fractures from a previous fracturing process. Examples of reservoir fluids include oil, gas, brine, and connate water.

The permeable channels of the reservoir matrix and the pores of the reservoir matrix have surfaces that are in contact with fluids flowing through the hydrocarbon-bearing reservoir. The surfaces of the pores of the reservoir matrix present a state of wettability. Wettability is the affinity of a fluid to a solid surface and can be inferred by the contact angle that the fluid, spreading and adhering to the solid surface, makes with the solid surface at the presence of another immiscible fluid. Wettability can include oil-wet, water-wet, and mixed wet.

Water-wet surfaces are surfaces that have a water wettability, at the presence of oil, with an oil contact angle (measured inside the oil phase) ranging between 120 degrees and 180 degrees. Oil-wet surfaces are surfaces that have oil wettability, that is, the oil-wet surfaces are the surfaces where oil spreads out along the surface or beads up on the surface. An oil-wet reservoir matrix is a reservoir matrix where oil is spread out on the surface of the reservoir matrix and the surfaces of the pores of the reservoir matrix. Without being bound to a particular theory, it is believed that most carbonate reservoirs are mixed wet (mixed oil-wet and water-wet) or oil-wet. For example, in marine or lacustrine sedimentary environments composed of carbonate rock the reservoir matrix is water-wet. During hydrocarbon migration in marine or lacustrine environments, the state of wettability of the reservoir matrix can be reversed from water-wet to oil-wet due to the adsorption of the polar or charged components present in the hydrocarbon phase onto the rock surface.

The method for recovering oil is part of an overall EOR method or tertiary oil recovery method. The method for recovering oil is suitable for use in hydrocarbon-bearing reservoirs having a production fluid with a high water cut. As used throughout, "production fluid" or "reservoir fluid" refers to a fluid recovered from a wellbore, that originates in the wellbore; production fluid and reservoir fluid are used interchangeably throughout. In at least one embodiment, the method is suitable for use in pair wells, or injection-extraction well systems. In at least one embodiment, the method for recovering oil is suitable for use with multi-well applications, such as multiple injection wells and production wells.

The imbibition gel composition is prepared by mixing the gel system and the surfactant. In at least one embodiment, the imbibition gel composition is mixed at the injection site before being pumped into the reservoir. In an alternate embodiment, the imbibition gel composition is mixed prior to being located at the injection site of the hydrocarbon-bearing reservoir. In at least one embodiment, the surfactant is mixed with a gel system of a linear polymer-crosslinker. Once gelation happens the surfactant is in the gel network.

The imbibition gel composition is mixed with a carrier fluid to create a conformance control fluid.

The gel system acts to retain the surfactant within the carrier fluid to ensure the surfactant reaches the oil-wet reservoir matrix. The gel system also aids in conformance control. The gel system can be in the form of gelants. Examples of gel systems include crosslinked gel systems. Crosslinked gel systems are formed from a polymer solution to which a crosslinker is added. Examples of crosslinked gel systems (denoted as polymer/crosslinker) include xanthum/Cr(III), polyacrylamide/Al(III), polyacrylamide/phenol-formaldehyde, sulfonated polyacrylamide/Cr(III), co-polymer of acrylamide tertiary buyl sulfonic acid with acrylamide/Cr(III), and acrylamide/N,N'-methylene-bis-acrylamide. In at least one embodiment, the crosslinked gel system is a 0.5% by weight sulfonated polyacrylamide crosslinked with a 0.01% by weight Chromium (III) crosslinker. In at least one embodiment, the gel system is in the absence of linear polymer.

The surfactant alters the wettability of the surfaces of the pores of the oil-wet reservoir matrix. The surfactant gradually releases from the gel system and diffuses through the carrier fluid. The surfactant moves into the free water phase present in the oil-wet reservoir matrix, including in the pores of the oil-wet reservoir matrix. Examples of surfactants include cationic surfactants and non-ionic surfactants. Examples of surfactants include a betaine-type amphoteric surfactant. The concentration of the surfactant in the imbibition gel composition is in the range of between about 0.05% by weight of the imbibition gel composition and about 10.0% by weight of the imbibition gel composition, alternately between about 0.1% by weight of the imbibition gel composition and about 5.0% by weight of the imbibition gel composition, alternately between about 0.3% by weight of the imbibition gel composition and about 0.6% by weight of the imbibition gel composition, alternately between about 0.5% by weight of the imbibition gel composition and about 1.0% by weight of the imbibition gel composition, alternately between about 0.5% by weight of the imbibition gel composition and 0.75% by weight of the imbibition gel composition, and alternately between about 0.75% by weight of the imbibition gel composition and about 1.0% by weight of the imbibition gel composition.

In at least one embodiment, the conformance control fluid contains 0.5% by weight of the gel system, where the gel system contains 1.0% by weight of the surfactant.

The slug size of the conformance control fluid is smaller than the slug size necessary for a regular surfactant flooding. In regular surfactant flooding, the slug size is in the range from about 0.3 to about 0.4 pore volume. The slug size of the conformance control fluid is between about 0.05 and 0.1 pore volumes. As such, the amount of surfactant used in the method for recovering oil is less than what would be used for a regular surfactant flooding operation.

The carrier fluid is any fluid that can be injected into the hydrocarbon-bearing reservoir from an injection site and fills the permeable channel of the hydrocarbon-bearing reservoir. Examples of carrier fluids include water-based fluids, hydrocarbon-based fluids, gas-based fluids, and combinations thereof. Examples of water-based fluids include water, produced water, connate water, seawater, and brine. The carrier fluid can be a brine having a salinity between about 35,000 ppm by weight and about 100,000 ppm by weight, and alternately between about 55,000 ppm by weight and about 60,000 ppm by weight. In at least one embodiment, the carrier fluid is seawater having a salinity of about 57,000 ppm. Without being bound to a particular theory, higher salinity in the water-based fluids results in lower interfacial tension, lower interfacial tension increases hydrocarbon recovery from the hydrocarbon-bearing reservoir.

After the conformance control fluid is mixed, the conformance control fluid is introduced into the hydrocarbon-bearing reservoir at the injection well. As the conformance control fluid is introduced into the hydrocarbon-bearing reservoir, the conformance control fluid fills the permeable channel connected to an injection well, conveying the imbibition gel composition into the permeable channel.

A free water phase is present in the permeable channels and pores due to the water-based fluids of a water flooding process performed before injection of the conformance control fluid or is the water present in the reservoir, such as formation brine. The free water phase can be pre-wash water.

In at least one embodiment, in the permeable channel, the imbibition gel composition slows at the surface of the oil-wet reservoir matrix relative to the velocity of the carrier fluid. The surfactant diffuses from the gel system of the imbibition gel composition to the carrier fluid because the imbibition gel composition has a higher chemical potential than the carrier fluid. The surfactant then adsorbs into the surfaces of the oil-wet reservoir matrix, including the pore surfaces, altering the wettability of the surfaces of the reservoir matrix, including the pore surfaces from oil-wet towards water-wet. The alteration of the wettability from oil-wet to water-wet causes spontaneous imbibition of the water phase into the reservoir matrix. As used here, "spontaneous imbibition" refers to a mechanism in which the wetting fluid displaces the non-wetting fluid in a porous media due to capillary forces. The spontaneous imbibition of the water phase into the reservoir matrix releases oil from the surfaces of the reservoir matrix, including the surfaces of the pores of the reservoir matrix. The shift in wettability of the surfaces of the reservoir matrix causes hydrocarbons previously attached to the oil-wet surfaces to bead on the, now altered, water-wet surface, which permits the free water phase to move into and contact additional surfaces of the reservoir matrix. In some cases, the beaded hydrocarbons completely detach from the altered surface as released hydrocarbons. In combination with the spontaneous imbibition, the released hydrocarbons can be forced away from the surfaces of the reservoir matrix, alternately can be pushed through capillary action further into the reservoir matrix, or alternately can be pushed out of the reservoir matrix. If pushed into the reservoir matrix through a contiguous fluid conduit, an equal amount of hydrocarbon fluid is driven out of the reservoir matrix at the other end of the contiguous fluid conduit. In some instances, the hydrocarbon fluid driven out of the reservoir matrix can be produced as part of the recovered oil.

The gel system does not adsorb into the surface of the reservoir matrix.

Following the injection of the conformance control fluid and the release of hydrocarbons to produce the recovered oil. A chase fluid is injected into the hydrocarbon-bearing reservoir and sweeps the recovered oil from the hydrocarbon-bearing reservoir to an offset production well as a production fluid. At least a portion of the carrier fluid is produced at the offset production well with the recovered oil and the chase fluid. In at least one instance, the chase fluid at the offset production well can contain additional particles collected in the hydrocarbon-bearing reservoir. The chase fluid collected at the offset production well is processed to separate the recovered oil for further collection and refining, along with separating the carrier fluid. In at least one embodiment, after the recovered oil is separated from the chase fluid, the chase fluid can be processed and reused.

The method of recovering oil provided achieves a total incremental oil recovery of recovered oil between about 1% of original oil in place (OOIP) by volume to about 10% of OOIP by volume, alternately between about 1% of OOIP by volume and about 6% of OOIP by volume, alternately between about 2% of OOIP by volume and about 5% of OOIP by volume, and alternately between about 3% of OOIP by volume and about 5% of OOIP by volume. In at least one embodiment, the method of recovering oil achieved a total incremental recovery of recovered oil of between about 3% of OOIP by volume and about 5% of OOIP by volume. In at least one embodiment, the total incremental oil recovery of recovered oil using the imbibition gel composition is 500% greater than the total incremental oil recovery of recovered oil using only a gel system.

The method for recovering oil can withstand the reservoir temperature of the hydrocarbon-bearing reservoir. The reservoir temperature is between about 70° C. and about 120° C., alternately between about 80° C. and about 110° C., and alternately between about 90° C. and about 100° C. In at least one embodiment, the reservoir temperature is about 100° C.

In the process of the method, the imbibition gel composition reaches the permeable channels and pores, where the surfactant promotes water imbibition into the reservoir matrix in order to release the remaining oil. In the process, the imbibition gel composition transports the surfactant, the imbibition gel composition impedes the movement of the surfactant with respect to the velocity of the injection fluid. As the imbibition gel composition slows at the surface of the reservoir matrix, so does the surfactant within. The imbibition gel composition allows for the gradual release of the surfactant, which in turn allows the surfactant to adsorb into the reservoir matrix. The adsorption into the surface of the reservoir matrix shifts the wettability towards a water-wet condition, releasing the oil film present on the surface of the reservoir matrix and promoting capillary action within the reservoir matrix to cause the hydrocarbons trapped within to flow from the reservoir matrix.

In an alternate embodiment, the method for recovering oil from a hydrocarbon-bearing reservoir can include three stages. In a first stage, an injection fluid can be injected into the hydrocarbon-bearing reservoir. The injection fluid can be part of a water flooding operation. The injection fluid fills the permeable channels. In one embodiment, the injection fluid creates additional permeable channels, such as fractures. In at least one embodiment, the injection fluid is a water-based fluid. In at least one embodiment, the injection fluid is brine. The injection fluid can leave free water in the permeable channels. In a second stage, the conformance control fluid is injected into the hydrocarbon-bearing reservoir and enters the permeable channels. The conformance control fluid alters the wettability of the surfaces of the permeable channels and pores as described in prior sections. The altered wettability causes hydrocarbons to release from the surfaces or to be produced from the pores and contiguous fluid conduits as described in prior sections. The carrier fluid of the conformance control fluid can be the same fluid as the injection fluid and from the same source. In one embodiment, the conformance control fluid is injected in a limited volume, such that the conformance control fluid does not displace the entire volume of free water that was present in the permeable channels before the conformance control fluid was injected. In a third stage, a chase fluid is injected into the hydrocarbon-bearing reservoir. The chase fluid serves the dual purpose of both carrying and pushing the imbibition gel composition deeper into the reservoir matrix and of sweeping the recoverable hydrocarbons toward the production well. The chase fluid can be a water-based fluid. The chase fluid can be part of a water flooding process. The chase fluid can be the same fluid used as the injection fluid or the carrier fluid or both the injection fluid and the carrier fluid, when the injection fluid and the carrier fluid are the same.

FIGS. 4A-D illustrate an embodiment of the method for recovering oil from a hydrocarbon-bearing reservoir. It should be understood that while the figures represent the stages of the method for recovering oil, certain of the stages and the steps within the stages can occur simultaneously.

Figure 4A:
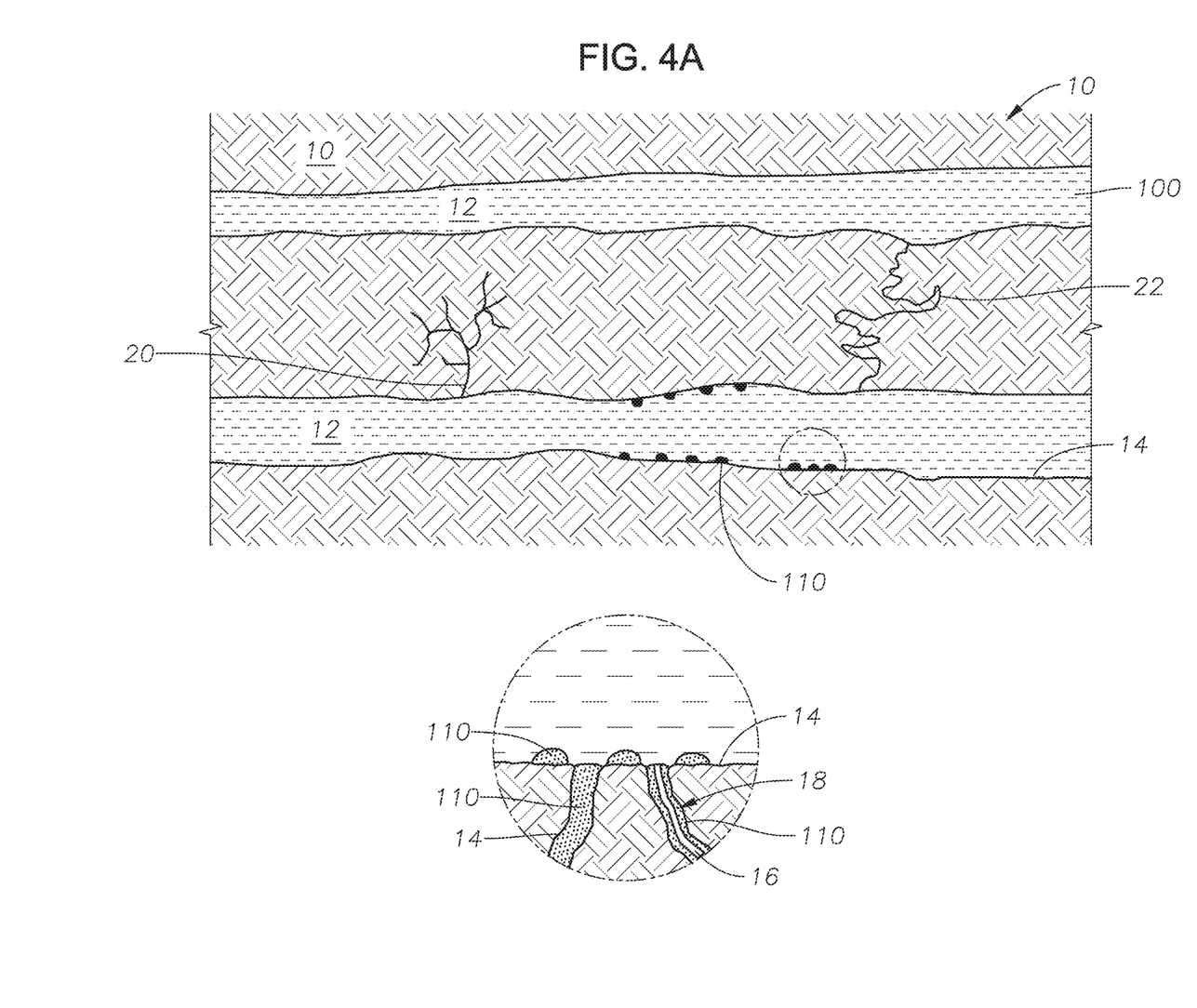
FIG. 4A-D are an illustrative representation of the method for recovering oil.

Referring to FIG. 4A, a representation of the hydrocarbon-bearing reservoir following a water flooding operation, where injection fluid 100 fills permeable channel 12 is provided. Permeable channel 12 traverses reservoir matrix 10. Permeable channels 12 have surfaces 14. Reservoir matrix 10 includes pores 16. Pores 16 can be filled with oil 110 or can have oil-wet surface 18. Reservoir matrix 10 can include non-contiguous conduit 20 and contiguous fluid conduit 22. FIG. 4A represents an oil-wet matrix, where oil 110 is present in various settings. Oil 110 can fill pores 16, can spread out on surface 14, or can beads up on surface 14 as shown in the detailed view of FIG. 4A.

Figure 4B:
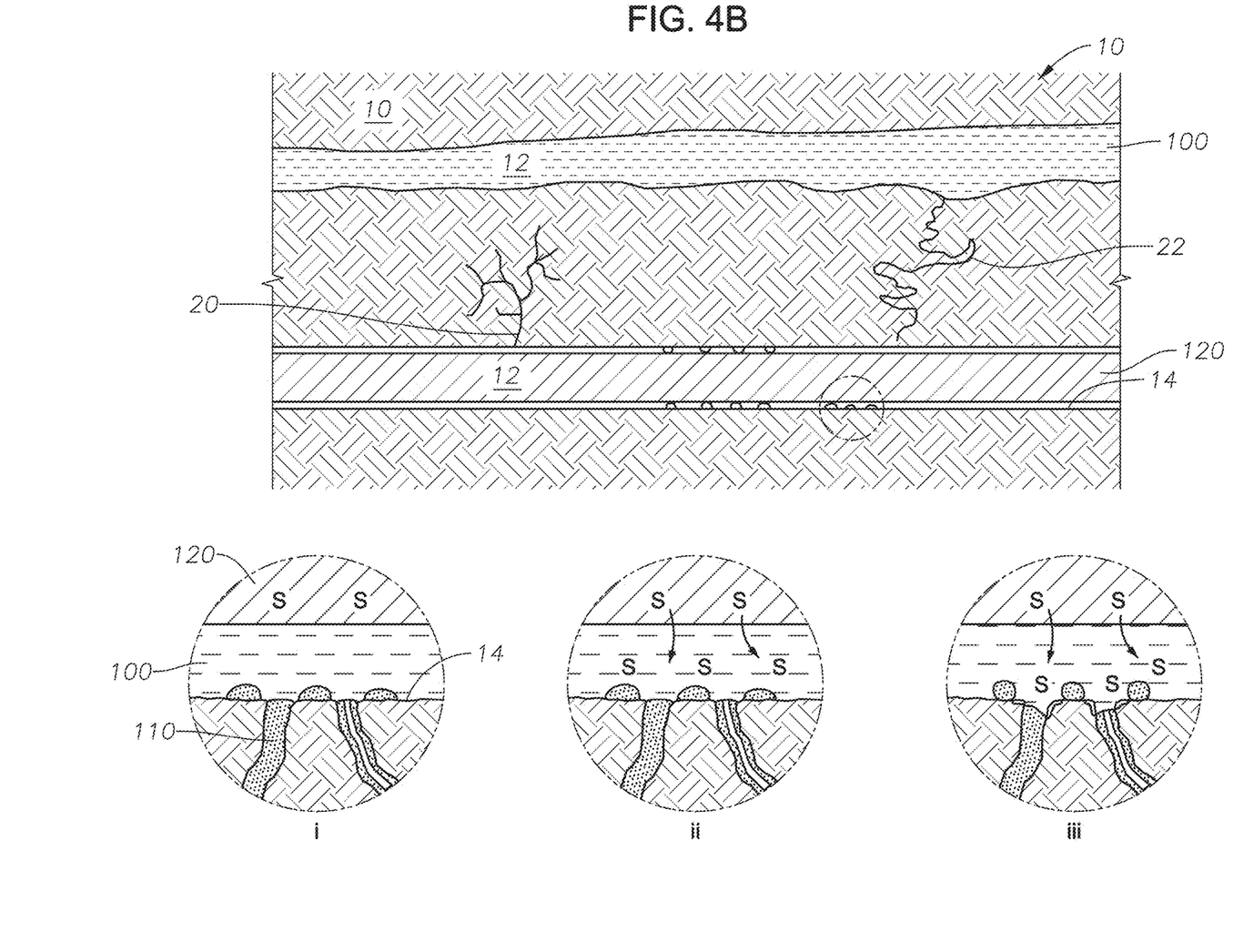

FIG. 4B is a representation of the hydrocarbon-bearing reservoir following a step in a method for recovering oil using an imbibition gel composition. Conformance control fluid 120 is injected into and fills at least one permeable channel 12. In one embodiment, injection fluid 100 forms a layer on surface 14 of permeable channel 12, as seen in detailed view (i). The layer of injection fluid 100 on surface 14 can be between 1 μm (micrometer) and 1 mm (millimeter), alternately between 1 μm and 5 μm, and alternately between 5 μm and 1 mm. The thickness of the layer of injection fluid 100 on surface 14 can depend on factors such as the width of the opening of the fracture and the shrinkage of the gel system. Conformance control fluid 120 includes surfactant S as shown in detailed view (i). In detailed view (ii), surfactant S diffuses from conformance control fluid 120 (and the gel system of the imbibition gel composition (not shown)) and into the layer of injection fluid 100 adjacent surface 14. In detailed drawing (iii), surfactant S adsorbs into surface 14 of reservoir matrix 10 and pore 16 displacing oil 110 spread out on surface 14 and causing oil 110 to bead. As used throughout, "bead" means to form a droplet or to coalesce. Oil 110 forms beads due to the change in the wettability of surface 14 of reservoir matrix 10 from oil-wet toward water-wet.

Figure 4C:
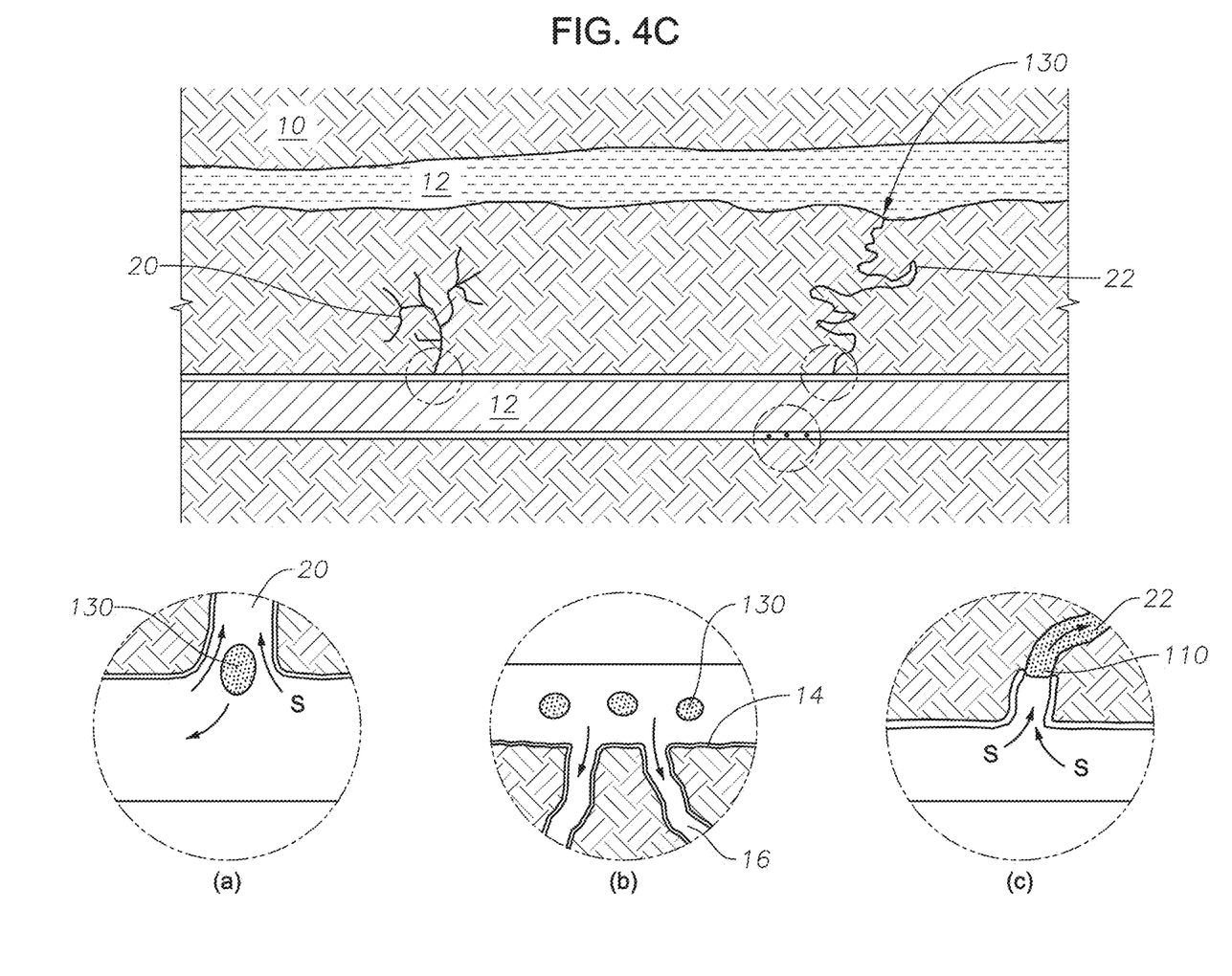

FIG. 4C is a representation of the hydrocarbon-bearing reservoir following a step in a method for recovering oil using an imbibition gel composition. FIG. 4C depicts released hydrocarbons from three types of structures found in reservoir matrix 10. FIG. 4C is a depiction of the various modes of oil recovery during the method for recovering oil using an imbibition gel composition. Detailed drawing (a) shows released oil 130 from non-contiguous conduit 20. Oil 110 is flushed out of non-contiguous conduit 20 as released oil 130 by water imbibition. Detailed drawing (b) depicts released oil 130 that detached from surface 14 due to surfactant S being adsorbed onto surface 14 of reservoir matrix 10 and into pores 16. Referring to FIG. 4B (iii) as the surfactant S adsorbs to the surface, oil 110 continues to bead until released as shown in FIG. 4C (b). In detailed drawing (c), as surfactant S adsorbs onto surface 14 of contiguous fluid conduit 22, the wettability of surface 14 is altered from oil-wet to water-wet. As the wettability of surface 14 is altered, the water phase of conformance control fluid 120 is pulled into contiguous fluid conduit 22 of reservoir matrix 10. Oil 110 retreats in the presence of conformance control fluid, by traveling through contiguous fluid conduit 22 away from the areas where surfactant S is adsorbing onto surface 14. As oil 110 retreats, more surface 14 of contiguous fluid conduit 22 is altered from oil-wet to water-wet. Oil 110 is pushed out of contiguous fluid conduit 22 into connected permeable channel 12 as released oil 130.

Figure 4D:
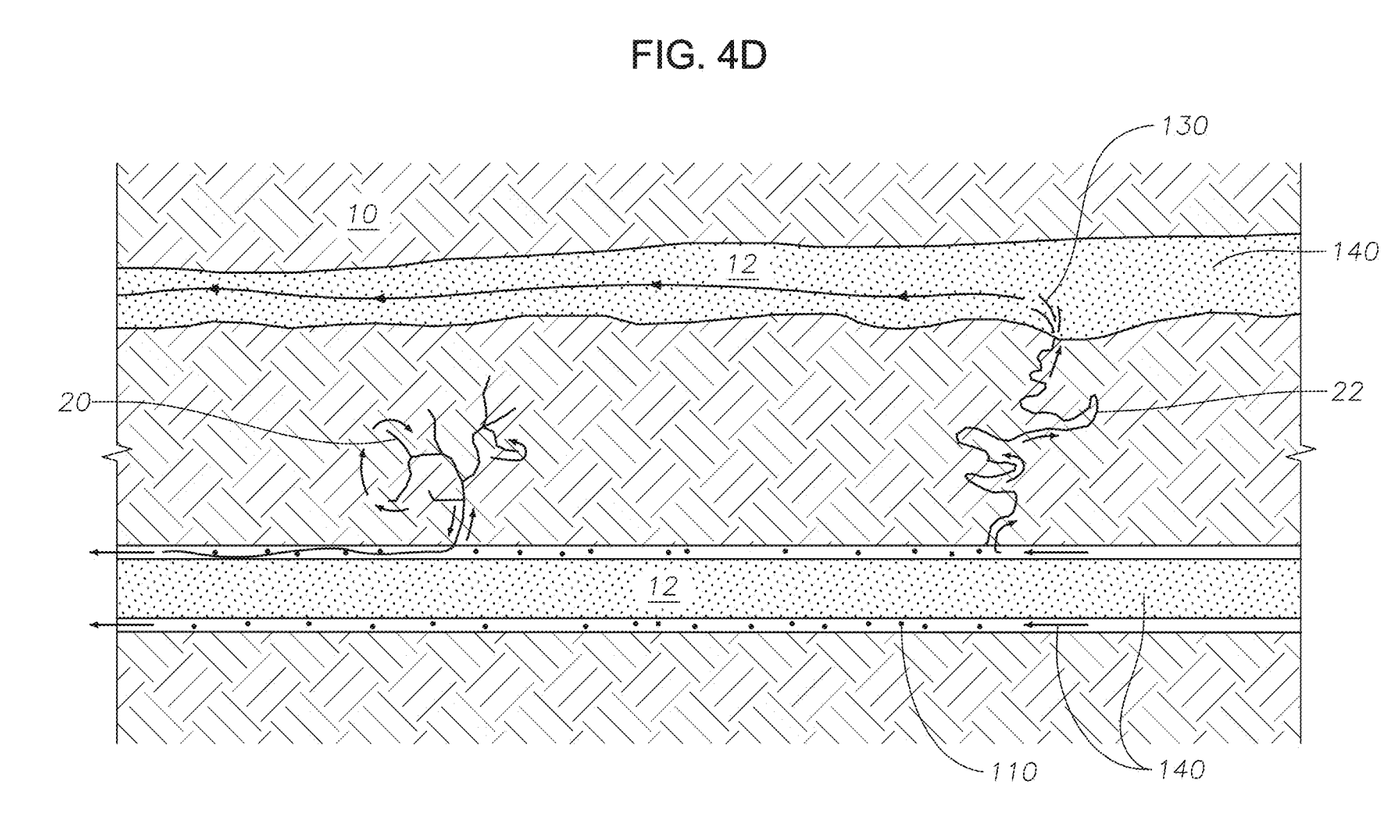

FIG. 4D is a representation of the hydrocarbon-bearing reservoir following a step in a method for recovering oil using an imbibition gel composition. FIG. 4D illustrates the step to recover released oil 130. Chase fluid 140 is injected into permeable channels 12 to push released oil 130 toward the production well (not shown). Chase fluid 140 can be any fluid used as a part of a water flooding process. Chase fluid 140 pushes released oil 130 toward the production well, regardless of whether released oil 130 is present as a stream or as beads. As chase fluid 140 is injected, conformance control fluid 120 can continue to be pushed into the pores and conduits in reservoir matrix 10.

EXAMPLES

The following describes the experimental set-up for the imbibition tests performed using saturated core plugs. The core plugs were saturated with crude oil and aged for 4 weeks to maintain the wettability of the oil-wet surfaces of the core plugs. The core plugs were cut into two pieces and artificially fractured using grains of carbonate rock to support the fracture.

Brine

Two brines were used in the imbibition test. Brine #1 was a connate water from a representative Saudi Arabian carbonate reservoir. Brine #2 was a synthetic brine. The composition of ions present in the brines can be found in Table 1. The total dissolved solids (TDS) in Brine #1 was 229,870 milligrams per liter (mg/L). The TDS in Brine #2 was 57,670 mg/L.

TABLE 1

Composition of Brine #1 and Brine #2

| | $Na^+$, mg/L | $Ca^{2+}$, mg/L | $Mg^{2+}$, mg/L | $Cl^-$, mg/L | $HCO_3^-$, mg/L | $SO_4^-$, mg/L | TDS, mg/L |
|---|---|---|---|---|---|---|---|
| Brine #1 | 66,052 | 19,008 | 2,239 | 140,580 | 384 | 1,620 | 229,870 |
| Brine #2 | 18,300 | 650 | 2,110 | 32,200 | 120 | 4,290 | 57,670 |

Crude Oil

The crude oil used in the experiment was a degassed crude oil.

Core Plug Sample Procedure

Two 1.5 inch diameter cylindrical carbonate core plug samples were cut from a whole core sample cored from a representative Saudi Arabian carbonate reservoir. The samples are core plug #338 and core plug #388. The gas permeability, pore volume, and porosity of each core plug were obtained by routine core analysis. The core plug samples weighed to obtain their dry weights after being cleaned and dried. The dried core plugs were vacuumed for about 8 hours and then a deaerated connate was introduced to saturate the core plug samples. The water saturated core plug samples were weighed again to obtain their wet weights. The core plug samples were centrifuged at 4000 revolutions per minute (RPM) under air for 5 hours to reach the irreducible water saturation and then centrifuged under crude oil to establish the initial oil saturation. The results of the tests are recorded in Table 2. The core plug samples were then stored in the crude oil for 4 weeks at 75° C. to age the core plug samples and change the wettability of the core plug surfaces to oil-wet.

TABLE 2

Core plug information

| Core Plug Sample | Porosity, % | Air perm., millidarcy (md) | Dry Weight, g | Wet Weight, g | Saturated brine vol., cc | Weight after centrifuge, g | Remaining water vol., cc | Irreducible water sat., % |
|---|---|---|---|---|---|---|---|---|
| 338 | 13.2 | 125.3 | 141.1406 | 148.768 | 6.663 | 141.88 | 0.646 | 8.68 |
| 388 | 15.9 | 120.4 | 125.677 | 135.627 | 8.610 | 126.40 | 0.625 | 7.33 |

Imbibition Test Procedure

Two gel system samples, sample 1 and sample 2, of 100 mL each were prepared as shown in Table 3. The gel system was a 0.5% by weight co-polymer of acrylamide tertiary butyl sulfonic acid (ATBS) and acrylamide (Flopaam™ AN125 by SNF Floerger) crosslinked with 0.01% Cr(III) by weight in Brine #2. The gel system samples were kept in a 95° C. oven overnight to initiate the crosslinker reaction with the polymer molecule. After the gel system samples were formed, 2 mL of surfactant, SS816, a betaine-type surfactant, was added to sample 2 to form a gel imbibition sample. The gel imbibition sample was kept in the oven overnight.

TABLE 3

Gel System Sample Formulations

| Sample | Polymer | Cross linker | Surfactant |
|---|---|---|---|
| 1 | 0.5% AN125 in Brine #2 | 0.01% Cr(III) | none |
| 2 | 0.5% AN125 in Brine #2 | 0.01% Cr(III) | 1% SS816 |

Figure 3:
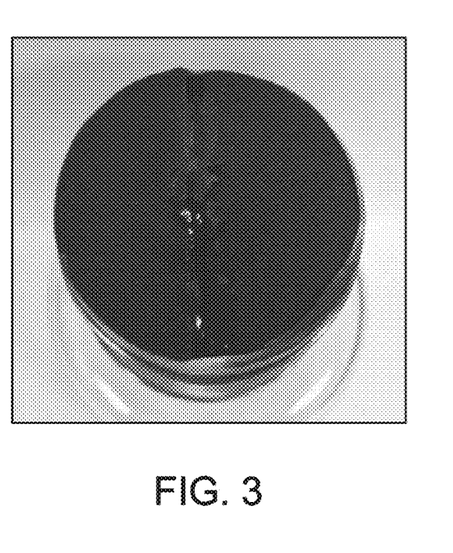
FIG. 3 is a pictorial representation of a fractured core plug sample prepared in the example.

Each core plug sample was cut along the length creating a longitudinal fracture. The weight of each core plug sample was measured after the fracture was created. The gel system of sample 1 was placed on the cross-section of core plug sample #338, carbonate rock particles were dispersed onto the gel system sample, and the other half-core was placed on top. The core plug sample #338 was wrapped in Teflon and the fracture aperture was held constant at 3 mm by carbonate rock particles. Finally, copper wire was wrapped around the ends of the core sample. The process was repeated using the gel system of sample 2 and core plug sample #388. See FIG. 3 for a picture of a prepared core sample.

Figure 2:
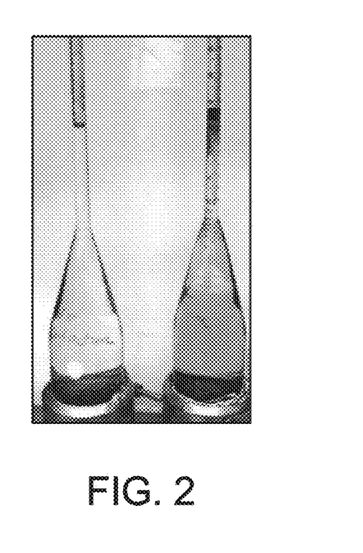
FIG. 2 is a pictorial representation of the imbibition cell.

Each fractured core plug sample was loaded into the imbibition cell. The cell was filled with Brine #2 and the imbibition cell was maintained at a temperature of 95° C. Oil produced from the core plug sample was collected by a graduated tube positioned at the top of the imbibition cell. The total time of the experiment was recorded. See FIG. 2 for a picture of the imbibition cells.

Results and Discussion

The initial volumes of oil saturated in the fractured core samples are shown in Table 4. After cutting, the original oil in place (OOIP) in core plug sample #338 was 6.813 mL and the OOIP in core plug sample #388 was 7.899 mL.

TABLE 4

Original Oil in Core Plugs

| Core Plug Sample | Weight with connate water, g | Weight before cutting, g | Weight after cutting, g | OOIP, cc |
|---|---|---|---|---|
| 338 | 148.768 | 146.759 | 136.758 | 6.813 |
| 388 | 135.627 | 133.204 | 124.034 | 7.899 |

The fractured core plug sample #338, with no surfactant in the gel system, produced 0.05 mL of oil during the imbibition test, a recovery of 0.73%. The fractured core plug sample #388, with the imbibition gel, produced 0.26 mL of recovered, a recovery of 3.29%.

Figure 1:
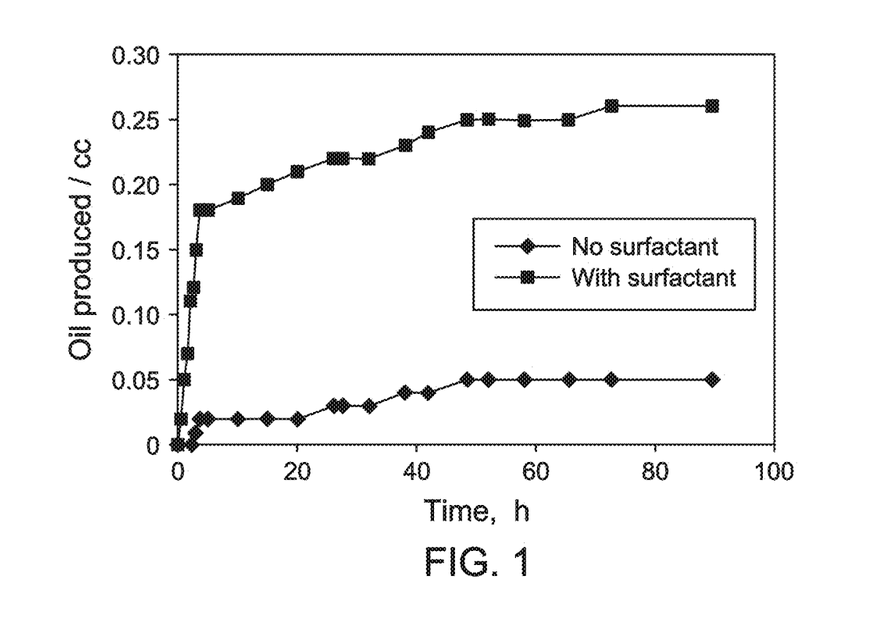
FIG. 1 is a graph of oil produced versus time from the example.

The results also show that most of the oil was recovered during the early part of the experiment. While incremental amounts of oil continued to be recovered over a period of about 90 hours, most of the oil was recovered in the first 2 to 5 hours as shown in FIG. 1.

Although embodiments have been described in detail, it should be understood that various changes, substitutions, and alterations can be made without departing from the principle and scope of the invention. Accordingly, the scope should be determined by the following claims and their appropriate legal equivalents.

The singular forms "a," "an," and "the" include plural referents, unless the context clearly dictates otherwise.

"Optional" or "optionally" means that the subsequently described event or circumstances can or may not occur. The description includes instances where the event or circumstance occurs and instances where it does not occur.

Ranges may be expressed throughout as from about one particular value to about another particular value. When such a range is expressed, it is to be understood that another embodiment is from the one particular value to the other particular value, along with all combinations within said range.

As used throughout and in the appended claims, the words "comprise," "has," and "include" and all grammatical variations thereof are each intended to have an open, non-limiting meaning that does not exclude additional elements or steps.

As used throughout, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope.

What is claimed is:

1. A conformance control fluid that induces spontaneous imbibition of a water phase into a reservoir matrix, the conformance control fluid comprising:
   an imbibition gel composition, the imbibition gel composition comprising:
   a surfactant, the surfactant contained within a gel network of a gel system,
      wherein the surfactant diffuses through a carrier fluid and the water phase from the gel system to a surface of the reservoir matrix,
      wherein the surfactant alters the wettability of the surface of the reservoir matrix from oil-wet toward water,
      wherein the surfactant is a betaine amphoteric surfactant, wherein the amount of surfactant is between 0.1% by weight of the imbibition gel composition and 5.0% by weight of the imbibition gel composition; and
   a gel system,
      wherein the gel system retains the surfactant in the gel system within a carrier fluid and the gel system further operable to release the surfactant in the presence of the water phase, wherein the gel system comprises gelants, wherein the gel system is a cross-linked gel system selected from the group consisting of xanthum/chromium (III), polyacrylamide/aluminum (III), polyacrylamide/phenol-formaldehyde, sulfonated polyacrylamide/chromium (III), co-polymer of acylamide tertiary butyl sulfonic acide with acrylamide/chromium (III), and acrylamide/N,N'-methylene-bis-acrylamide,
      wherein altering the wettability of the surface of the reservoir matrix toward water-wet induces the spontaneous imbibition of the water phase into the reservoir matrix; and
   the carrier fluid, the carrier fluid operable to carry the imbibition gel composition into contact with the surface of the reservoir matrix, wherein the carrier fluid contains 0.5% by weight of the gel system,
   wherein the imbibition gel composition is mixed with the carrier fluid before the conformance control fluid is introduced to a reservoir matrix.

2. The conformance control fluid of claim 1, wherein the carrier fluid is water-based.

3. The conformance control fluid of claim 1, wherein the carrier fluid comprises a brine, the brine having a salinity, wherein the salinity is between 35,000 ppm by weight and 100,000 ppm by weight.

4. The conformance control fluid of claim 1, wherein the carrier fluid comprises a brine, the brine having a salinity, wherein the salinity is between 55,000 ppm by weight and 60,000 ppm by weight.

* * * * *